P. F. WILLIAMS.
SWITCHING BOX.
APPLICATION FILED FEB. 1, 1918.

1,401,021.

Patented Dec. 20, 1921.

Witnesses:

Inventor:
Paul F. Williams
Atty.

P. F. WILLIAMS.
SWITCHING BOX.
APPLICATION FILED FEB. 1, 1918.

1,401,021.

Patented Dec. 20, 1921.
3 SHEETS—SHEET 2.

Witnesses:

Inventor:
Paul F. Williams
Atty.

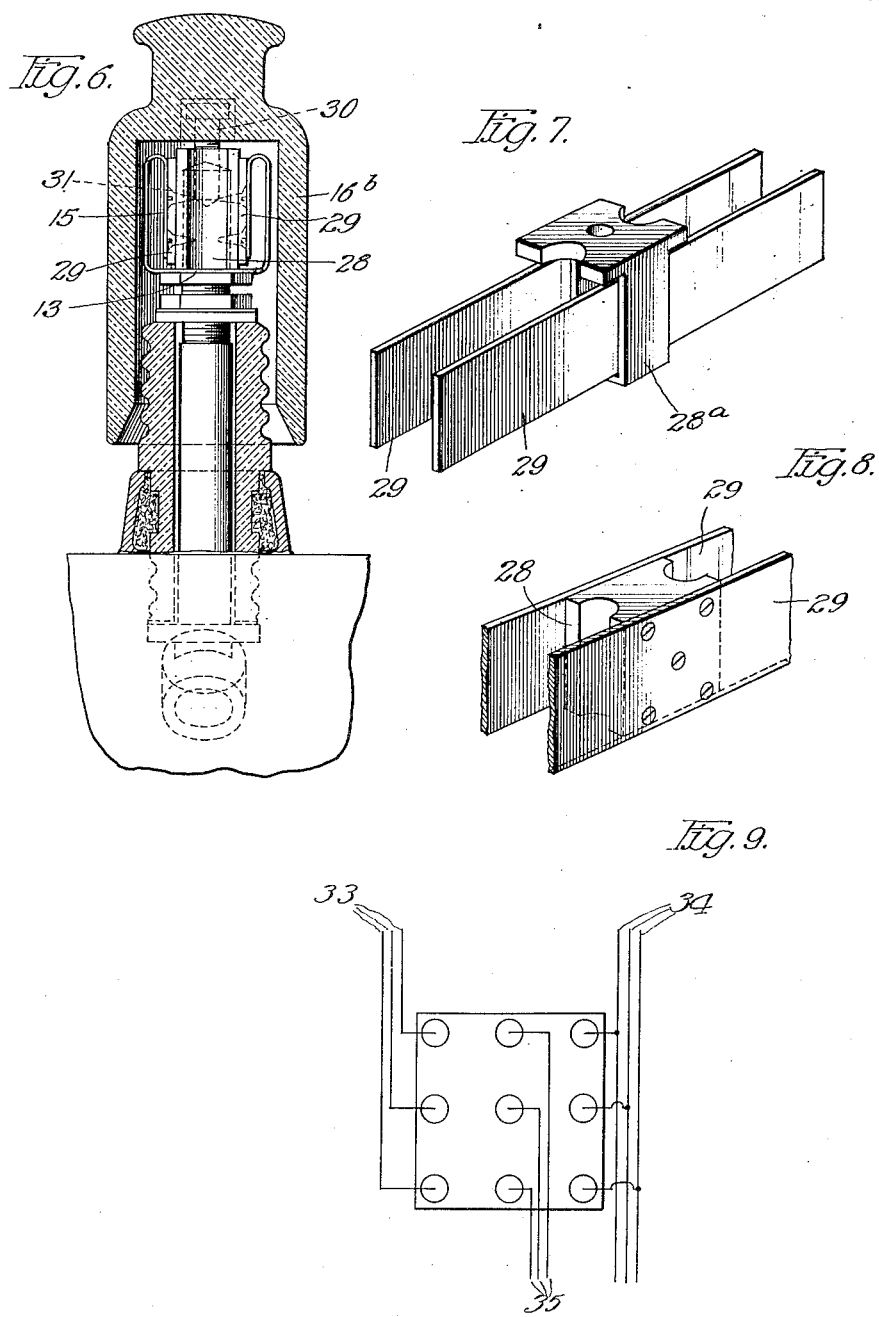

UNITED STATES PATENT OFFICE.

PAUL F. WILLIAMS, OF CHICAGO, ILLINOIS, ASSIGNOR TO G & W ELECTRIC SPECIALTY CO., OF CHICAGO, ILLINOIS, A CORPORATION OF ILLINOIS.

SWITCHING-BOX.

1,401,021.  Specification of Letters Patent.  Patented Dec. 20, 1921.

Application filed February 1, 1918. Serial No. 214,860.

*To all whom it may concern:*

Be it known that I, PAUL F. WILLIAMS, a citizen of the United States, residing at Chicago, in the county of Cook and State of Illinois, have invented a certain new and useful Improvement in Switching-Boxes, of which the following is a full, clear, concise, and exact description, reference being had to the accompanying drawings, forming a part of this specification.

My invention relates to switching boxes particularly for use in connection with underground cables.

One of the objects of the invention is to provide a practical and advantageous construction of switching box.

Another object of the invention is to arrange an effective construction by which the terminals of the switching box can be connected with one another or may be properly covered when out of use.

Another object of the invention is to arrange for the complete insulation of the various parts of the terminal and connecting device.

In the accompanying drawings Figure 1 is a vertical section of a junction box embodying my invention;

Fig. 6 is a vertical section of a modified form of connecting device;

Figs. 7 and 8 are perspective views of details of construction, Fig. 8 of one of the parts of the device of Fig. 6, and Fig. 7 of a modification of same;

Fig. 9 is a diagrammatic view of one arrangement of circuit connections which may be used with the device.

Figure 1:
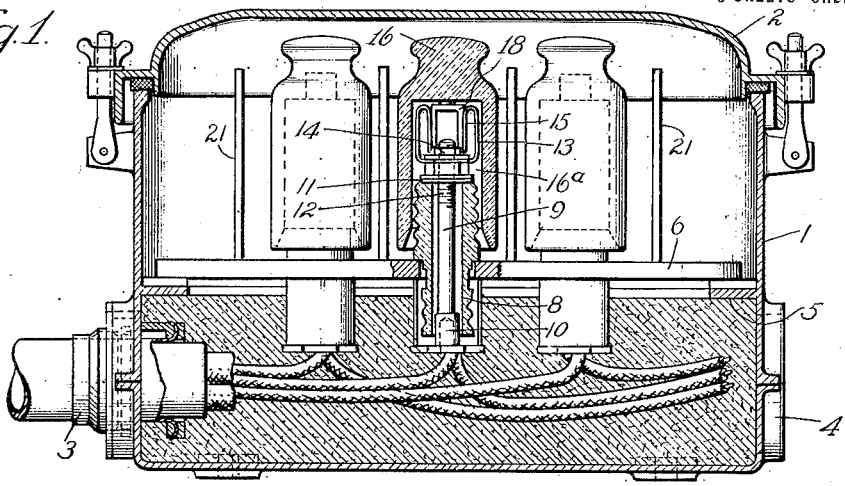
Figure 2:
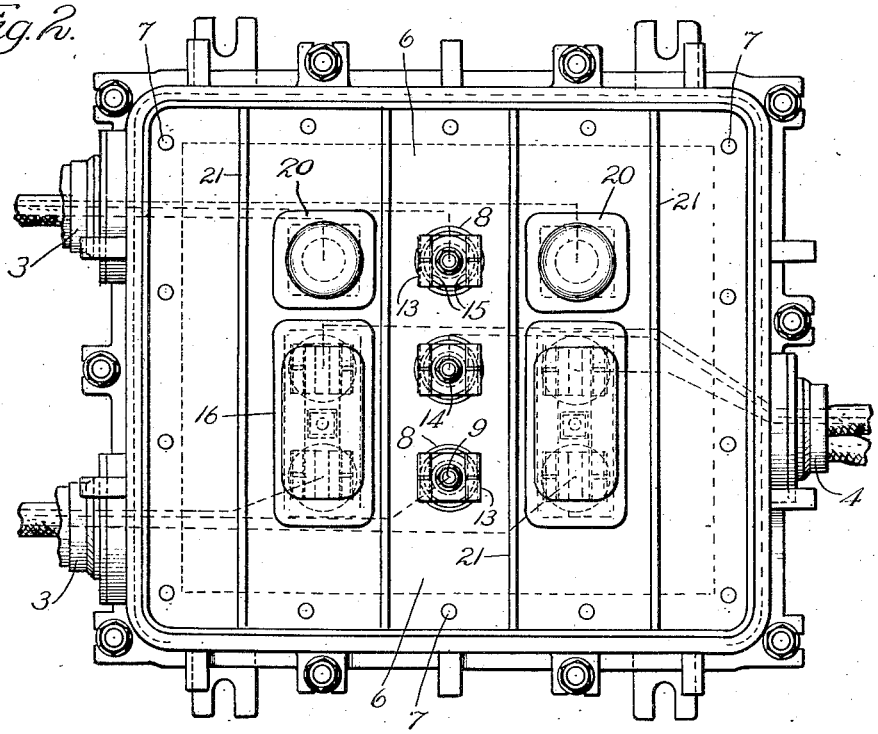
Fig. 2 is a plan view of the same.

Referring first to Figs. 1 and 2, I show a device having a base or body member 1 and a top or cover 2 which may be used or not as desired. The base or body member 1 is in the form of a hollow or box-like structure having one of its sides provided with two inlets 3—3 for cables and an outlet 4 on the other side. A shelf or ledge 5 projects inwardly from the wall of the box 1, upon which is mounted a floor 6 which is secured in place by suitable bolts or screws 7. On this floor 6 in turn are mounted a series of insulator outlets 8—8 in the form of tubes or insulating material extending above and below the floor 6. In each one of these insulators 8 there is a metallic terminal 9 having its lower end provided with a socket portion 10 in which the end of a cable strand is inserted and connected. This metal terminal 9 extends up beyond the open upper end of the outlet 8 and is held in position by washers or collars 11 screw threaded upon a threaded portion 12 of said member 9. On the upper end of this post 9 there is mounted a contact clip 13 held in position by a nut 14, said clip 13 having doubled back ends 15 serving as spring contact members. Mounted upon each outlet 8 is an insulating cap or hood 16 which fits over the end of the outlet 8 and also over the spring clip 13. This cap or hood 16 is provided with a metal contact 18 adapted to fit in between the spring members 15 and make contact with the same. These coöperating contact members 15 and 18 serve to support the hood 16 and hold it in position. It will also be seen that the hood 16 has a chamber 16ª preferably of such size that the hood does not come in contact with the contact clip 13 nor with the insulating outlet 8. The cap or hood 16 is of such length as to cover two outlets 8, as best shown in Fig. 2. Accordingly, the metal contact of clip 18 is adapted to extend between two adjacent outlets 8 and to fit into the metal clips 13 thereof. Thus connection may be made between any two adjacent outlets 8 by putting a hood 16 over such outlets so that the contact 18 makes connection with the two clips 13 of such outlets.

I also provide a single outlet hood 20 adapted simply to cover a single outlet. This hood 20 is provided with a metallic member 18 of such size as to fit into one of the clips 13. In Fig. 2 I show some of the outlets 8 covered by connecting hood devices 16, others simply covered by single outlet covers 20 and others not covered at all. Between the several rows of outlets 8 upright walls 21 are preferably provided, separating several rows of outlets from one another and thereby preventing improper connection of cable conductors, it being possible to connect only outlets in the same row with one another. These walls also prevent arcing between the various outlets.

Figure 3:
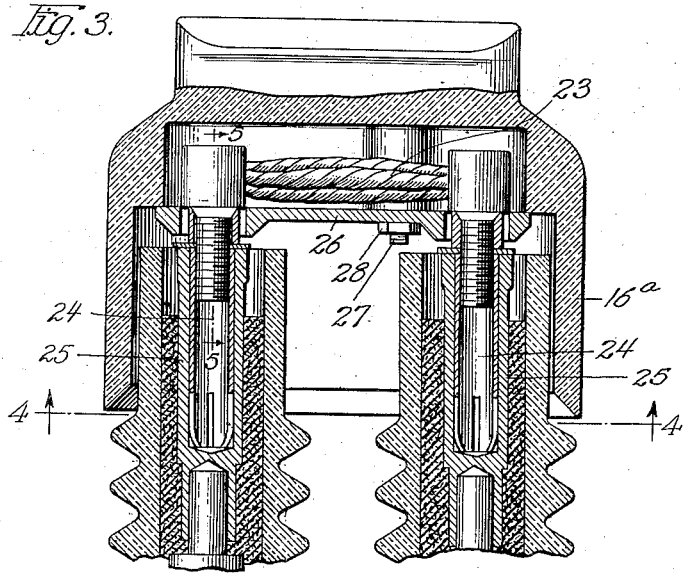
Fig. 3 is a cross section of a modified form of terminals and a connecting device therefor.
Figure 4:
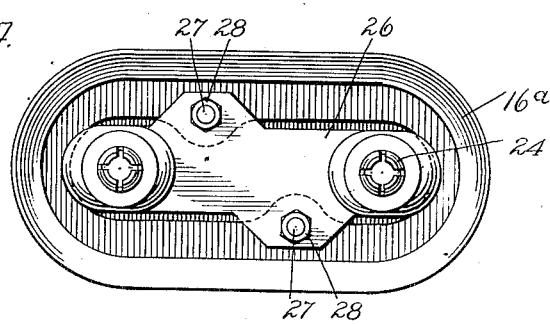
Fig. 4 is a bottom plan of the connecting device looking upwardly.
Figure 5:
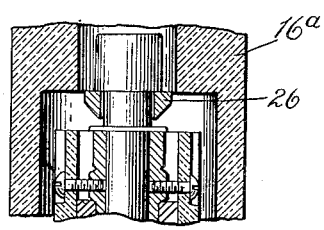
Fig. 5 is a section taken on line 5—5 of Fig. 3.

In Figs. 3, 4 and 5 I show a modified form of connecting hood 16ª, in which there are wire strands 23, connecting rods 24 fitted loosely in the hood 16ª so that a certain amount of play is permitted to said members 24 allowing them to accommodate themselves to irregularities in position and adjustment of the metallic socket members 25. The plug members 24 are held in position by means of a plate 26 to which they are connected, said plate 26 being in turn held in position by screws 27 and nuts 28, the ends of the bolts 27 being embedded in the material of the hood 16ª.

In Figs. 6 and 8 I have shown a modified form in which the cap or hood 16ᵇ is provided with a metallic member 28, to which are fitted metallic contact strips 29—29, the member 28 being secured to the hood 16ᵇ by means of a bolt 30, the end of which is embedded in the top of the member 16ᵇ. The straps 29 fit between and against the spring ends 15 of the clip 13. The member 28 has a loose connection with the hood 16ᵇ so that the straps 29 may adjust themselves to the two members which they are to connect.

The members 29 are secured to the member 28 by means of screws 31.

In Fig. 7 I show a modified form of arrangement for the device of Fig. 6, in which arrangement the members 29 instead of being secured by screws 31 are held in position by passing through slots in a member 28ª similar to the member 28.

In Fig. 9 I show a circuit arrangement which may be used with the box. In this arrangement one set of feeders 33 are connected with one set of outlets, these feeders 33 being for the localities to be served by the box. Another set of feeders 34 runs to the opposite row of outlets, the feeders 34 being intended for use for another locality, but being tapped into the box shown. The mains 35 to serve the locality of this box are connected with the intermediate row of outlets. Thus under normal circumstances the feeders 33 will be connected with the mains 35, but in case of a breakdown of the feeders 33 or for other reasons the second set of feeders 34 may be temporarily connected with the mains 35 by the connecting devices.

It will be understood that changes and modifications may be made without departing from the spirit of the invention.

What I claim is:

1. A switching box provided with upstanding outlets and caps for connecting said outlets, said outlets and caps being provided with loose coöperating contacts by which adjustment may be made when a cap is fitted to a pair of outlets.

2. A switching box having a series of outlets arranged in rows, connecting devices for connecting said outlets with one another and walls between rows of connecting devices whereby outlets in the same row may be connected but outlets in one row may not be connected with outlets in another row.

3. In a switching box, upstanding outlets and caps for connecting the same, said outlets and caps being provided with coöperating contact devices consisting of two parts, one part attached to each outlet and the other part attached to the cap, the part attached to the outlets consisting of spring clips forming spring jaws and the part attached to the cap consisting of an elongated metallic member adapted to fit into the spring jaws of two adjacent outlets.

4. In a switching box, upstanding outlets and caps for connecting the same, said outlets and caps being provided with coöperating contact devices consisting of two parts, one part attached to each outlet and the other part attached to the cap, the part attached to the outlets consisting of spring clips forming spring jaws and the part attached to the cap consisting of an elongated metallic member adapted to fit in to the spring jaws of two adjacent outlets, said elongated metallic member being loosely mounted on said cap.

In witness whereof, I hereunto subscribe my name this 26th day of December, A. D. 1917.

PAUL F. WILLIAMS.